Dec. 8, 1964     O. C. HOLDERER     3,159,926
CLINOMETER ASSEMBLY

Filed Nov. 28, 1962     2 Sheets-Sheet 1

Oscar C. Holderer,
*INVENTOR.*

BY

Dec. 8, 1964   O. C. HOLDERER   3,159,926
CLINOMETER ASSEMBLY
Filed Nov. 28, 1962   2 Sheets-Sheet 2
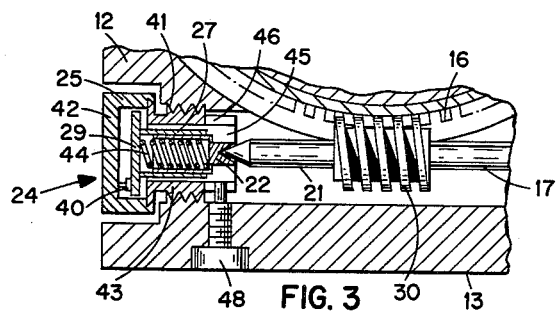
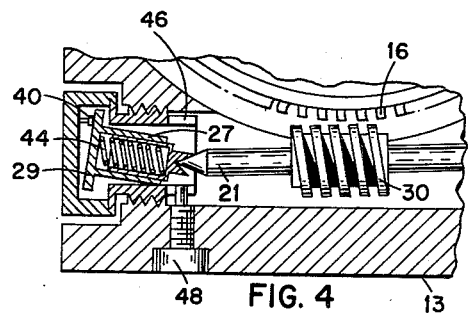
Oscar C. Holderer,
INVENTOR.
BY S. J. Rotondi
A. L. Dupont
Jack W. Voigt

United States Patent Office 3,159,926
Patented Dec. 8, 1964

3,159,926
CLINOMETER ASSEMBLY
Oscar C. Holderer, 2304 Oakwood Ave. NW., Huntsville, Ala.
Filed Nov. 28, 1962, Ser. No. 240,761
5 Claims. (Cl. 33—214)
(Granted under Title 35, U.S. Code (1952), sec. 266)

The invention described herein may be manufactured and used by or for the Government for governmental purposes without the payment of any royalty thereon.

This invention relates to a clinometer assembly and more particularly to a clinometer used for measuring relatively large inclinations. Previous clinometer assemblies required tedious manipulation of the vernier dial in order to effect large angular displacements of the level indicator.

Therefore it is an object of this invention to provide a clinometer which eliminates tiresome vernier manipulation when making large inclination measurements.

Another object of this invention is to provide a clinometer in which large inclinations can be measured quickly and precisely.

The foregoing objects will become more apparent upon consideration of the following detailed description and the accompanying drawings, in which:

FIGURE 3 is a fragmentary sectional view of the disengagement mechanism with the worm in normal control position.

FIGURE 4 is a view, similar to FIGURE 3, showing the worm in a disengaged or uncontrolling position.

Figure 1:
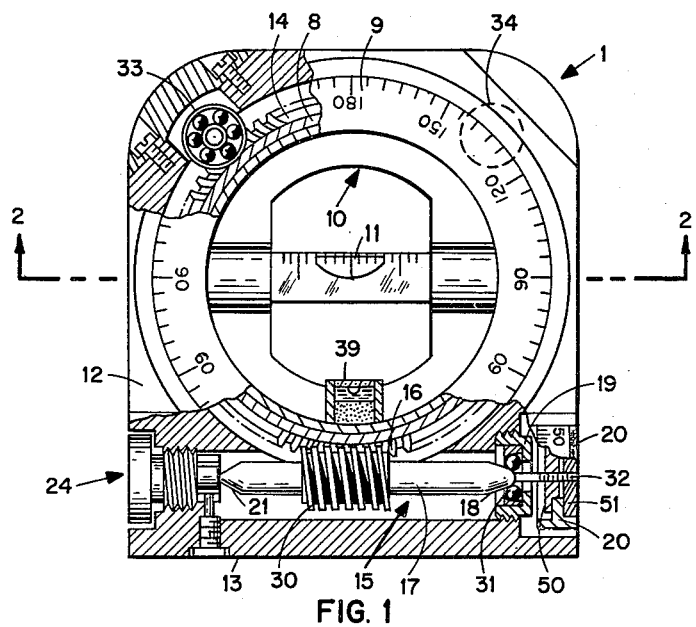
FIGURE 1 is an elevation view, partly broken away, of the clinometer assembly.

Referring to the drawings, FIGURE 1 shows clinometer 1 to include a datum frame 12 having a base surface 13. A leveling and inclination measuring assembly 10 is rotatably mounted on the frame in a plane normal to surface 13. A worm mechanism 15 is provided to effect rotary movement of assembly 10, and a disengaging mechanism 24 provides means for disengaging worm mechanism 15 from the assembly 10.

Assembly 10 includes a backing ring 8 and a calibrated annular dial 9 affixed concentrically to the ring. A sensitive spirit level 11 is rigidly affixed diametrically of ring 8. A second less sensitive spirit level 39 is also affixed to the ring along a chord of the ring parallel to level 11.

Ring 8 has a track 14 about its periphery which rides on bearings 33 and 34 journaled to frame 12 thereby providing smooth, relatively friction-free, rotation of assembly 10.

Figure 2:
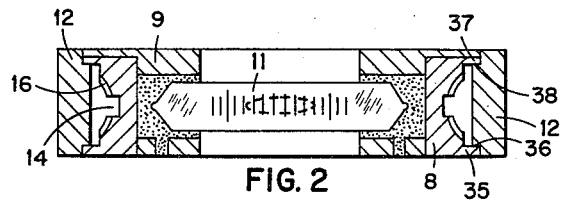
FIGURE 2 is a sectional view taken along line 2—2 of FIGURE 1.

Ring 8 of assembly 10 is also provided with flanges 35 and 37 extending outwardly from its periphery (FIGURE 2). Flanges 35 and 37 engage grooves 36 and 38 respectively machined in frame 12 to prevent lateral movement of assembly 10 relative to the frame. Enough clearance is left between flanges 35 and 37, and grooves 36 and 38 to permit the rotation of the assembly (FIGURE 2).

Worm mechanism 15, which provides controlled rotation of assembly 10 includes a shaft 17 having one rounded end 18 and one conically shaped end 21. A worm 30 formed integral with shaft 17 engages a worm wheel 16 formed on the periphery of the ring 8 as shown in FIGURES 1, 2, 3 and 4. A retaining ring 19, in threaded contact with frame 12, carries a bearing 31. The bearing seats rounded end 18 of shaft 17. A threaded rod-like extension 32 is formed integrally with shaft 17 and projects through bearing 31. A vernier dial 20 is rigidly attached to this extension by inner and outer retaining rings 50 and 51, respectively, in threaded contact with extension 32. Conical end 21 of shaft 17 is supported by a cone pivot 22 carried by the disengaging mechanism 24 (FIGURE 3).

Disengaging mechanism 24 includes a two post thumb screw 25 screwed into a suitably threaded opening 41 in the housing 12. Thumb screw 25 includes a hollow base portion 42 and an externally threaded sleeve 43 affixed thereto and having an open inner end 45. A cup 27 having a flanged base 29 is loosely retained within sleeve 43 of thumb screw 25. A stop 40 is located in base portion 42 of the thumb screw and adjacent to the peripheral wall thereof. The head end of the stop presses inwardly against the flanged base 29 of cup 27 to maintain the cup in the position illustrated in FIGURE 3. Cone pivot 22 is carried in cup 27 and is biased from the base thereof by a spring 44. The spring biases cone pivot 22 away from the base of cup 27 towards open end 45 of thumb screw 25. The bias keeps cone pivot 22 thrust against the conical end 21 of shaft 17.

A crescent shaped flange 46 is formed integrally with thumb screw 25 adjacent the inner end of the thumb screw and extends longitudinally from the thumb screw. A set screw 48 is threaded through the base 13 of the frame and extends into the path of flange 46. The set screw thus limits the rotation of thumb screw 25 to one-half a turn as seen in the FIGURES 3 and 4.

In operation, base surface 13 of datum frame 12 rests on a surface whose inclination is to be measured. Let it be assumed that worm 30 and worm wheel 16 are in engagement and that a large rotation of dial assembly 10 is necessary to bring spirit level 11 to its level position. The position of the components of disengagement mechanism 24 illustrated in FIGURE 3 is necessary to provide engagement between worm 30 and worm wheel 16. Stop 40, being below the axis of rotation of shaft 17, provides the upward thrust necessary to maintain the engagement. A rotation of thumb screw 25 placing stop 40 above the axis of rotation of shaft 17, as shown in FIGURE 4 will allow the shaft to pivot about its end 18, FIGURE 1. The pivotal movement of shaft 17 causes worm 30 to disengage from worm wheel 16 as illustrated in FIGURE 4. Dial assembly 10 can then be rotated freely until the desired dial position is neared. The approach of the desired position can be predicted by the level indication of the relatively insensitive spirit level 39.

When desired position is neared, as indicated by level 39, thumb screw 25 is rotated so as to re-engage worm 30 with worm wheel 16. Precise adjustment of dial assembly 10 can now be made by rotating the vernier 20 until the sensitive spirit level 11 indicates achievement of the desired position.

Thus it will be appreciated that this invention provides the means of measuring large inclinations quickly, easily, and without loss of accuracy.

It is to be understood that various modifications of the clinometer design described herein can be made without changing the spirit and scope of the invention as claimed.

The invention claimed is:

1. A clinometer assembly comprising a datum frame; an annular calibrated level indicator mounted on said frame for rotation about a horizontal axis; a drive mechanism engaging said indicator to provide controlled rotation thereof; a disengaging mechanism to provide disengagement of said drive mechanism from said indicator for free rotation thereof comprising a thumb screw in threaded connection with said frame, said thumb screw having a hollow base portion and a sleeve affixed thereto, a cylinder loosely mounted within the sleeve portion of said thumb screw, a peripheral flange on said cylinder within the base portion of said thumb screw, a headed stop pin eccentrically mounted in the base portion of said thumb screw for engagement with the outer face of said peripheral flange; support means carried in said sleeve for support of one end of said disengaging mechanism and for biased relation thereof with said indicator, said thumb screw disposed for rotation of said stop pin for pivotal movement of said disengaging mechanism for free rotation of said indicator, a crescent shaped flange formed integral with the sleeve portion of said thumb screw and extending inwardly therefrom, and a stop screw fixed to said frame and interposed into the path of movement of said crescent shaped flange to limit rotation of said thumb screw to substantially 180 degrees.

2. An assembly as set forth in claim 1 including gear means disposed about the periphery of said indicator; said drive mechanism comprising an elongate shaft having a rounded and conical end and a worm disposed thereon intermediate said ends, said worm being movable into engaged and unengaged relation with said gear means for respective controlled and free rotation of said indicator.

3. A device as set forth in claim 2 wherein said support means includes a bearing having a conical ground seat; a spring mounted in said sleeve intermediate said bearing and said peripheral flange; said conical end of said shaft disposed for snug fitting self-aligning engagement with said conical seat and said spring dispoesd to provide the biased relation of said shaft for the movement thereof.

4. A device as in claim 3 provided with vernier adjusting means including a knob having a scale that indicates the measured inclination in increments less than said calibrated indicator.

5. A device as in claim 3 wherein said vernier adjustment means further includes a rod-like extension formed integrally with said shaft at said rounded end thereof; retaining rings secured to said extension in threaded relation therewith for retention of said knob on said extension.

References Cited in the file of this patent

UNITED STATES PATENTS

| | | |
|---|---|---|
| 1,822,740 | Loeser | Sept. 8, 1931 |
| 2,066,193 | Bassett | Dec. 29, 1936 |
| 2,906,032 | Holderer | Sept. 29, 1959 |